Nov. 19, 1946.  W. A. WILLIAMS  2,411,491
X-RAY EXPOSURE CALCULATOR
Filed Nov. 23, 1944  4 Sheets-Sheet 1

INVENTOR.
WILLIAM A. WILLIAMS
BY
ATTORNEYS

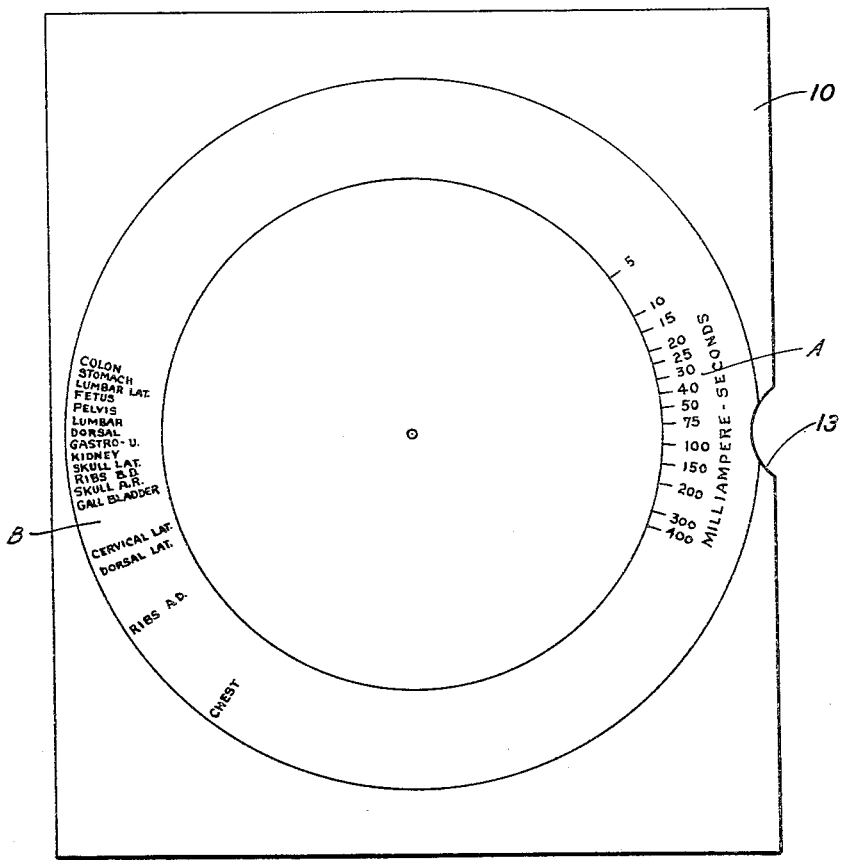

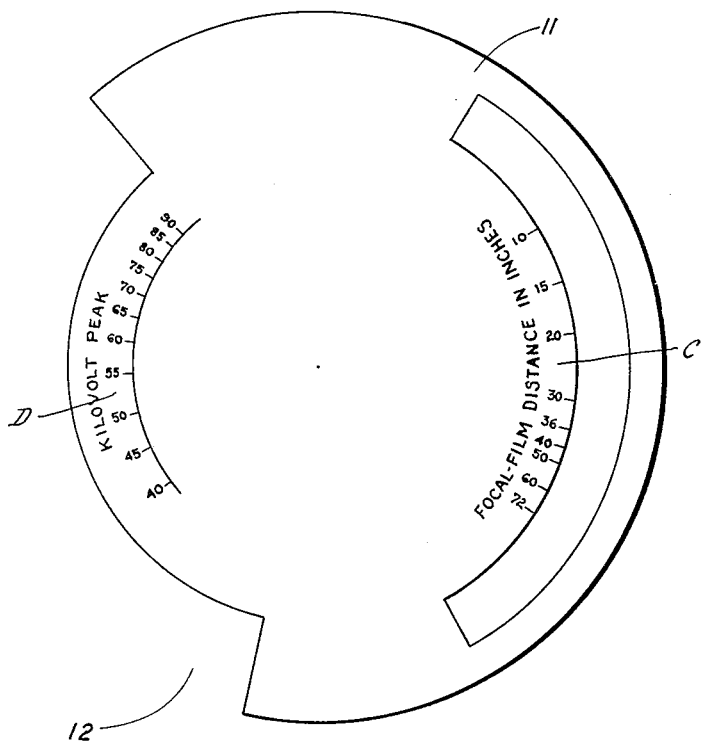

Nov. 19, 1946.  W. A. WILLIAMS  2,411,491
X-RAY EXPOSURE CALCULATOR
Filed Nov. 23, 1944  4 Sheets-Sheet 4

INVENTOR.
WILLIAM A. WILLIAMS
BY
ATTORNEYS

Patented Nov. 19, 1946

2,411,491

UNITED STATES PATENT OFFICE 2,411,491

X-RAY EXPOSURE CALCULATOR

William A. Williams, Port Crane, N. Y., assignor to General Aniline & Film Corporation, New York, N. Y., a corporation of Delaware Application November 23, 1944, Serial No. 564,873

3 Claims. (Cl. 235—64.7)

This case pertains to an exposure guide or calculator for use in X-ray work. The guide is especially adapted to determine the so-called primary factors which enter into the determination of various settings in the exposure of a radiograph.

According to common practice, the determination of the factors entering into radiography is accomplished pretty much by trial and error. There are charts which are supplied by manufacturers of X-ray equipment and also similar charts made up by those who manufacture film and chemicals. However, these charts are always developed for a particular X-ray machine and pertain to only one type of film and one particular developer. There are a great many films varying in speed, contrastiness, and other characteristics, also a variety of developers each of which has peculiar characteristics in accordance with the purpose to which it is to be put.

There are a great many variable factors in radiography, but most of them are standardized in a given laboratory, such as for example, the transformer, intensifying screens, film, chemicals, grids, etc. The four operating variables are the kilovoltage, milliamperage, exposure time, and distance. These basic factors are to be determined by use of the calculator hereinafter described.

Among the objects of the exposure calculator is that of providing the X-ray technician or other user with a calculator in the form of a slide rule which may be employed within certain limits for practically any and all work within the particular field for which the guide has been developed. In this disclosure, the guide described by way of example is for X-ray work pertaining to the human body. It is to be understood that the invention is by no means limited to that class of work, and similar guides may be made up employing the principles herein disclosed, but for application to other X-ray problems.

In the work of the type for which the guide is employed, the variables are (1) time of exposure, (2) tube current, (3) focal (tube) film distance, (4) kilovolt-peak. The first two are herein combined and are denoted as milliampere-seconds. Of course, there are then the different parts of the body which may be radiographed and also the thickness of such parts, that is, the distance which must be penetrated by the rays. For other classes of work, there would be similar variables, and likewise, each class of work would have distinguishing characteristics which might be compared to those above mentioned with respect to the X-ray of the human body.

In carrying out the invention, a circular slide rule has been developed, but it is to be understood that the mechanism itself may take some other form, and this application is, therefore, not to be limited to a circular type instrument, or in fact, to a simple calculator only. Of course, the other scales remain substantially as hereinafter described.

The calculator is made up from several elements, one of which is termed a base and which has on it certain scales, and a plurality of movable elements pivoted on said base and which are generally circular in form. Each of these has on it certain scales or other marks to be employed in determining the data or settings to be used. Each is cut away at certain places for allowing observation of the scales on those elements at a different (lower) plane. The scales are all developed in a particular manner which will be described in the following, more detailed part of the disclosure. In addition to the scales on which are marked the parts of the anatomy, the milliampere-seconds, the focal distance, thickness of part, and the kilovolt-peak, there is provided an index mark or fenestra on a transparent, movable disk which is also set against a compensating index scale arbitrarily graduated. This last mentioned scale is for the purpose of calibrating the instrument to that particular machine, for which it is used, for peculiarities in the current supplied, screens, the film, the developer, and also other variables which must necessarily be taken into account.

The invention is to be described by reference to one particular embodiment of the same as evidenced in the accompanying drawings, in which:

Fig. 2 is a detail of the so-called stationary or base member entering into the construction of the guide.

Fig. 3 shows the lowermost movable element.

Figure 1:
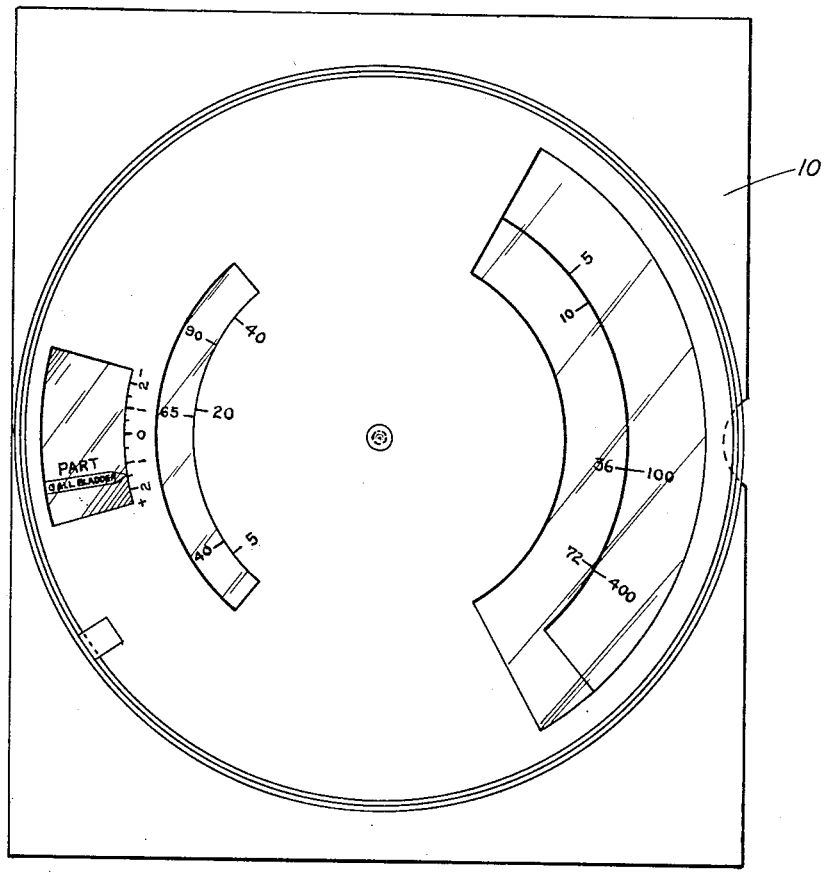
Fig. 1 is an assembled view of the complete exposure guide, some only of the graduations and figures for the scales being shown to simplify illustration and to make more easily understandable an example of use of the instrument later to be given.

Now referring to the various figures, the separate parts of the exposure guide have been illustrated in detail. In Fig. 2, the base member generally indicated by numeral 10 is of rectangular outline, although some other shape will serve. At the right-hand side of the member there is provided a scale A ranging from 5 to 400 and labeled milliampere-seconds. This scale pertains to the current at the tube and the time of exposure. In some instances the scale may run to higher values of current output, but normally more than 400 milliamperes is not employed.

At the opposite side of the base there are listed on a scale B, at different radial lines, the parts of the body which are frequently radiographed. These are arranged in accordance with their densities. The relative distances through which they are spaced is determined by trial, although the relative relationship which each bears to the other in accordance with its density would naturally be known.

In Fig. 3, the first movable disk 11 is shown having a generally circular form, but cut away at 12 so as to expose the indicia at the left-hand scale on the base member. This disk should have a diameter of about the width of the base which may be notched as at 13 so as to permit movement of the disk 11. Each of the elements is frictioned just sufficiently so that it will remain in position until intentionally reset at some different value.

The movable disk 11 has a scale C marked "focal film distance in inches" and a number of graduations indexed from 10 to 72. Radiographs of the human body are most always confined to that focal distance, although it is possible that the guide might be extended to include some lesser or greater distance. Throughout the normal ranges of radiography, the reciprocity law holds true for direct radiation. Where intensifying screens are used, a slight adjustment may be made when laying out the kilovolt-peak scale. That is, of course, contrary to what prevails throughout other branches of photography and is of particular advantage here because it assures that a definite relationship exists between the milliampere-seconds scale and the distance scale. Since the reciprocity law holds for all reasonable conditions, the time and intensity of exposure and the distance approximately follow the inverse square law. Therefore, in graduating these scales, the distance scale is first indexed and is a true logarithmic scale. The milliampere-second scale is then calibrated by applying the above-mentioned law.

The low end of the scale is to be marked at 5 milliampere-seconds. Then assuming graduations are to be marked at increments as shown from 5 to 400, the corresponding focal distance is calculated as the square root of the multiple of increased milliampere-seconds over the basic 5 and multiplying that by the lowest mark on the distance scale (10 inches). Then the 10-inch mark is set opposite the 5 milliampere-second graduation and the remainder of the milliampere graduations are plotted opposite their corresponding calculated values on the distance scale.

At the opposite or left-hand side of the disk 11, the kilovolt-peak scale D is graduated from 40 to 90. This scale is not marked off in accordance with any predetermined, calculable values. It is obtained by a number of trial exposures in which some particular part is radiographed a number of times at each of which different milliampere-seconds are selected. This scale will be described more fully in a following paragraph.

Figure 4:
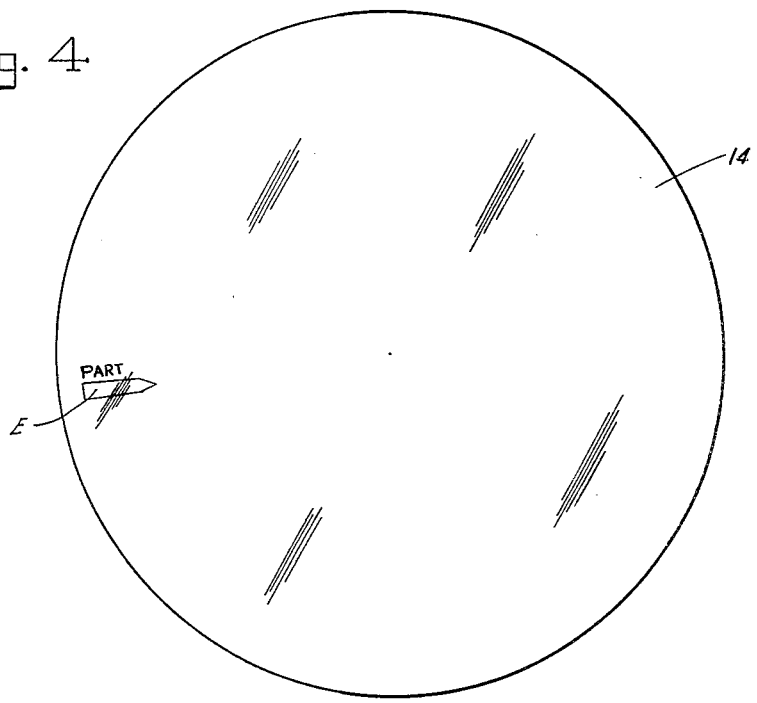
Fig. 4 is a view of the transparent element.
Figure 5:
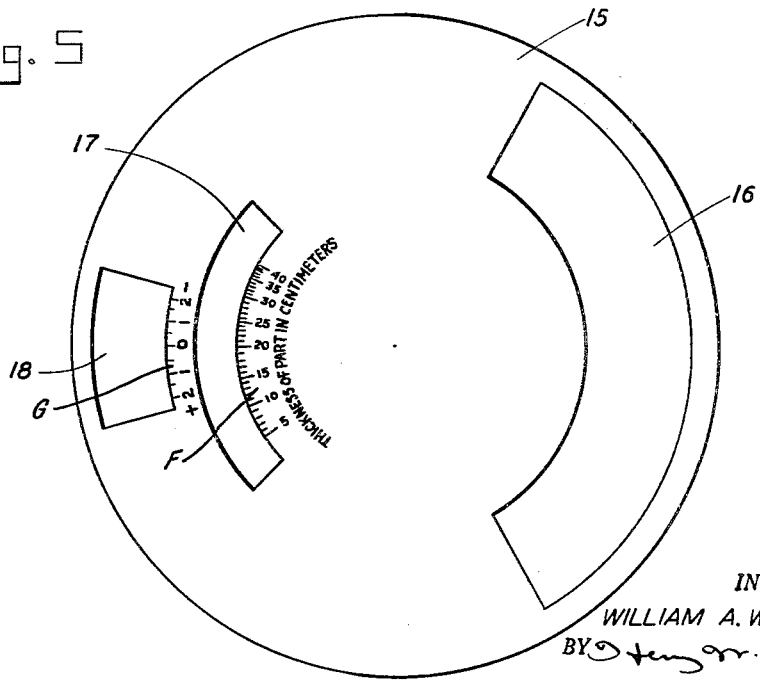
Fig. 5 is a similar view of the topmost element.

Now referring to Fig. 4, the disk 14 is of transparent material and has an index mark or fenestra E pointing centrally or inwardly of the disk and of a size to enclose one of the part designations at the right of the base 10. This disk is rotatable with respect to the base and with respect to the disk 11 but normally is attached to or connected to move with the topmost disk 15, Fig. 5.

Disk 15 has a cut-out portion 16 through which the milliampere-second and distance scales A and C are observed. At the opposite side there is a similar cut-out slot 17 through which the kilovolt-peak scale D may be seen, and adjacent the inner margin of the slot 17 and in registry with the kilovolt-peak scale F is a scale marked "Thickness of part in centimeters." That scale is normally graduated from 5 to 40 and pertains to the thickness of the part which is to be penetrated by the rays. This scale is likewise obtained by running a series of trial exposures and will be graduated at the same time the kilovolt-peak scale is marked off on the first disk.

Outside the cut-out slot 17 is another and shorter slot 18 adjacent which is a scale G known as the compensating index scale, but which is not necessarily so marked. This scale is arbitrarily graduated in increments of five kilovolts. In one direction, they are indicated as being minus and in the other plus. That is also an arbitrary indication and merely assists in compensating, or resetting some previously used compensation when returning to a similar set of conditions after working under others for a period of time.

The index mark on the transparent disk 14 is always set opposite some one of these compensating index graduations and, of course, that is determined by trial. The disk 14, once the index mark has been set, then becomes a part of disk 15 in so far as its movements are to be governed by the settings of that disk. To that end they are interconnected in some manner, preferably by the use of Scotch tape or some other adhesive material which may be quickly removed when a different setting is desired. As an alternative means some form of mechanical clamp may be used.

Now returning to the description of the manner in which the scales are calibrated, the focal distance and the milliampere-seconds scales C and A, as before stated, are marked off by graduating the first logarithmically and then by employing the inverse square law to determine the intensity-time indications. For the other scales the method to be applied is that of taking a series of exposures of some particular subject, said exposures being of a selected part against which the part index or fenestra, disk 14, is set. At that time, the index is centered at the zero position on the calibrating scale G and the disks 14 and 15 are temporarily locked so as to move together. The exposures taken are taken at the focal distance most commonly used for the particular part. They are also taken at progressively changing milliampere-second increments and at and to either side of what would normally be thought to be a satisfactory kilovolt-peak setting. Of course, the thickness of part is known, but it is not marked on the scale at that time. Assuming, for example, that the part photographed had been set at the left-hand index scale and that 72 inches is the focal distance, then that 72-inch graduation is set opposite the milliampere-second graduation which applies in accordance with the current being used. About three exposures are taken varying the kilovolt-peak, and the best one of those exposures is selected. The selection is made in accordance with normal standards of contrast. That value of kilovolt-peak is then marked off on the scale D opposite a similar mark showing the thickness of part, the latter being determined by direct measurements.

Other subjects are radiographed so as to get a number of values for the kilovolt-peak for different thicknesses of part. It is not necessary to go through the entire thickness scale, since what is actually done is to take extremes and representative points in between those extremes from which a curve may be drawn. All other points are picked from the curve.

The above-mentioned procedure is then repeated for the different parts of the body as listed at the left-hand side of the base member 10. The values are likewise plotted as curves and the values inserted. Of course, after the thickness of part scale F has been determined and after the kilovolt scale has once been calibrated, the subsequent test exposures merely serve as a check and to determine the position at which the applicable body part is to be marked on base 10.

What has been done to this point should pertain to some definite laboratory, representative film, and developer, etc. and should have been accomplished without resort to different screens or appurtenances which may later be employed. In fact the instrument as graduated, and with the index set at zero, applies to average conditions and to ordinary technique for some particular film, the developer, and other variables having been standardized. Then the instrument may be employed for different films, different developers, and with various screens and diaphragms, in accordance with individual preference in diagnosis, so long as a compensating or calibrating setting at the index scale G has been effected. Of course, at the first instance of changing films, changing Bucky ratio, various screens, or otherwise varying the basic technique, a test exposure or two may be necessary to determine the amount of the calibration. Once that has been determined for the abovementioned variables, it is recorded and other settings may be used after which the guide may be reset to obtain similar exposures to those originally effected.

Figure 6:
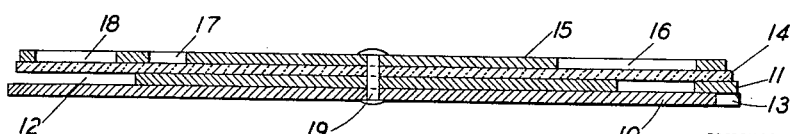
Fig. 6 is a section at the horizontal center line, Fig. 1.

Referring to Fig. 6, a section is shown in which the various elements are illustrated as they are superimposed upon the base 10 and on underlying movable elements, also as they are rotatable about a central pivot 19. The disk 11 is rotated or moved by engaging the edge at the cut-out notch 13. Each of the disks 14 and 15 is progressively smaller in diameter and thus the edges can be frictionally engaged for rotating or for holding any particular disk in position.

The instrument may be fabricated from various materials, for example, cardboard or some type of fibrous material, except for the transparent disk which may be of Celluloid or any of the commonly used transparent plastics. Metal may be employed for the non-transparent parts, if desired.

In operation, assuming that the instrument has been employed under the existing conditions and that a correction factor or compensating factor of plus 1½ has been determined, the following example is given by way of illustration. Assume that the part of which a radiograph is to be made is the gall bladder, the index of fenestra is set for that part at the left-hand base scale, and of course, the said index would have been previously fixed in place at the plus 1½ mark on the compensating scale. Such a radiograph should normally be taken at a focal distance of 36 inches and since 100 milliamperes is a fair current for the tube, and one second for the speed at which the radiograph is to be taken, 100 on the milliampere-second scale is set opposite 36 on the distance scale. From direct measurement, the thickness of part has been found to be 20 centimeters. Then with the instrument set as above described, the kilovolt-peak opposite 20 on the thickness scale is found to be 67. A radiograph taken at those settings should have normal exposure and normal contrast. Now assuming that some other film or developer is to be used, or that a different screen or intensifying means is to be employed the correction value or compensating difference for which is something other than that just used, the transparent disk is disconnected from the top disk and the new setting effected after which the two are again clamped in position. The same process is repeated and the calculator will again show values of current and voltage combinations from which the technician may expect to obtain comparable results. Some physicians desire to employ other than the usual focal distances and also the time of exposure may be varied according to individual preference. The calculator is merely set taking into account the focal distance desired or the milliampere-seconds to be used and the corresponding kilovolt-peak may then be read directly opposite the thickness of part applicable.

Some physicians prefer more contrasty radiographs than others. This is accomplished by changing either the milliampere-seconds or the distance factor on the calculator, keeping in mind that the lower the kilovolt-peak, the greater the contrast.

On changing films or developers, or both, similar compensating changes may be made and for each film or developer combination, the compensating factors may be recorded or kept in mind so that no matter what film or developer combination is employed, representative results may be obtained. While the scales have been graduated in accordance with the milliampere-seconds and the kilovolts within which the X-ray of the human body can be included, the instrument may be adapted to work in metals or other materials in which far different values of current and voltage are necessary. The principles of the invention apply and scales are made up having in mind the requirements for the particular type of radiographic work for which the calculator is to be used.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. An X-ray exposure calculator having in combination a plurality of relatively movable, disk-like members including a base member, a first movable member, a transparent member and a top movable member superimposed upon the base member in the order stated; said base member having at one side a milliampere-seconds scale and at the opposite side, a scale denoting character of the subject to be radiographed; said first movable member having a focal distance scale in cooperating relationship to the milliampere-seconds scale, and at the opposite side, a kilovolt-peak scale; the transparent member having an index mark in registry with the subject scale; and said top member having at one side, a thickness of part scale cooperating with the kilovolt-peak scale and a compensating index scale adjacent one end of the index mark on the transparent member; said members being cut away at areas above each of the scales so that all may be visible from the face of the instrument, the top member and the transparent member being adapted to move as a unit when temporarily connected.

2. An X-ray exposure calculator having in combination a plurality of relatively movable, disk-like members including a base member, a first movable member, a transparent member and a top movable member superimposed upon the base member in the order stated; said base member having at one side a milliampere-seconds scale and at the opposite side a scale denoting various parts of the human body; said first movable member having a focal distance scale cooperating with said milliampere-seconds scale and an opening through which the milliampere-seconds scale can be seen, and at the opposite side, said first movable member being cut away to expose the part scale and also having a kilovolt-peak scale; said transparent member having an index mark in alignment with the part scale; and the top member being so constructed as to have a compensating index scale for cooperation with the index mark, an opening through which the index mark and the part scale are visible, a thickness of part scale for cooperation with the kilovolt-peak scale, an opening through which the kilovolt-peak is visible and at the opposite side, an opening through which both the milliampere-seconds and the focal distance scales are seen, the top member and the transparent member being adapted to move as a unit when temporarily connected.

3. An X-ray exposure calculator having in combination a plurality of relatively movable, disk-like members including a base member, a first movable member, a transparent member and a top movable member superimposed on the base member in the order stated and rotatable about a central pivot; said base member having at one side a milliampere-seconds scale and at the opposite side, a scale denoting parts of the human body; said first movable member being cut away above the milliampere-seconds scale on the base member so that the scale may be visible and having radially inward of said cutaway portion and in cooperation with the milliampere-seconds scale, a logarithmic, focal distance scale, and at the opposite side, a cut-out section above the part scale and radially inward of that cut-out portion, a kilovolt-peak scale; the transparent disk having an index mark for setting about some one of the part designations on the underlying scale at the base member, an inwardly directed index pointer; said top member being cut away to render visible the index mark and the part scale and having a compensating index scale radially inward of the cut-away section and for cooperation with the pointer of the index mark, a second cut-out section above the kilovolt-peak scale and radially inward of that section, a thickness of part scale, and at the opposite side, a relatively wide cut-out section through which both the milliampere-seconds and the focal distance scale are visible, the top member and the transparent member being adapted to move as a unit when temporarily connected.

WILLIAM A. WILLIAMS.